June 15, 1926.
H. A. FINK ET AL
1,589,059
CAN MAKING MACHINE
Filed August 17, 1921    6 Sheets-Sheet 5
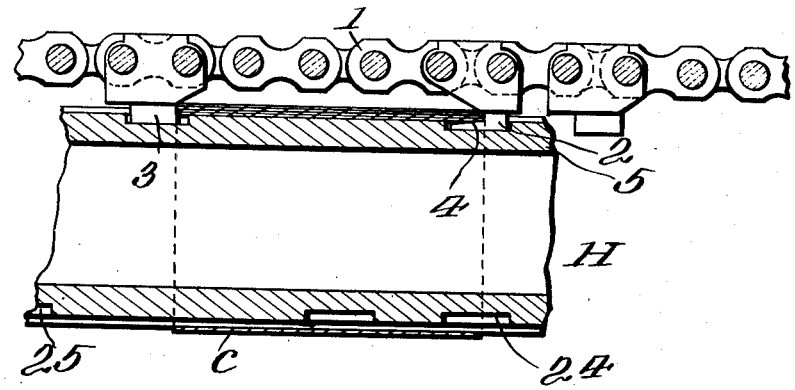
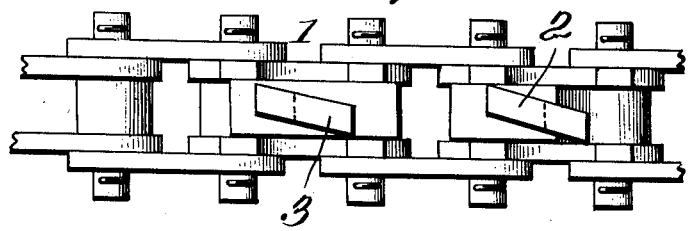
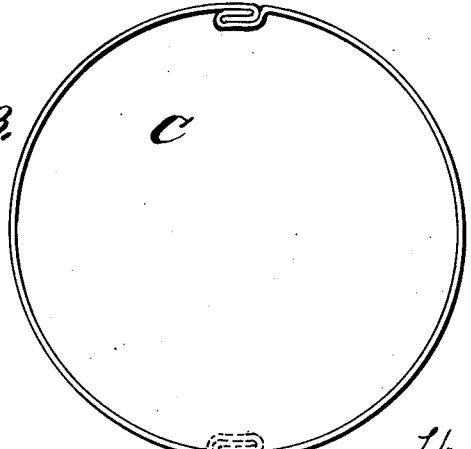
Inventors
Henry A. Fink
Alfred L. Kronquest
By Sturtevant & Mason
Attorneys June 15, 1926. 1,589,059
H. A. FINK ET AL
CAN MAKING MACHINE
Filed August 17, 1921 6 Sheets-Sheet 6
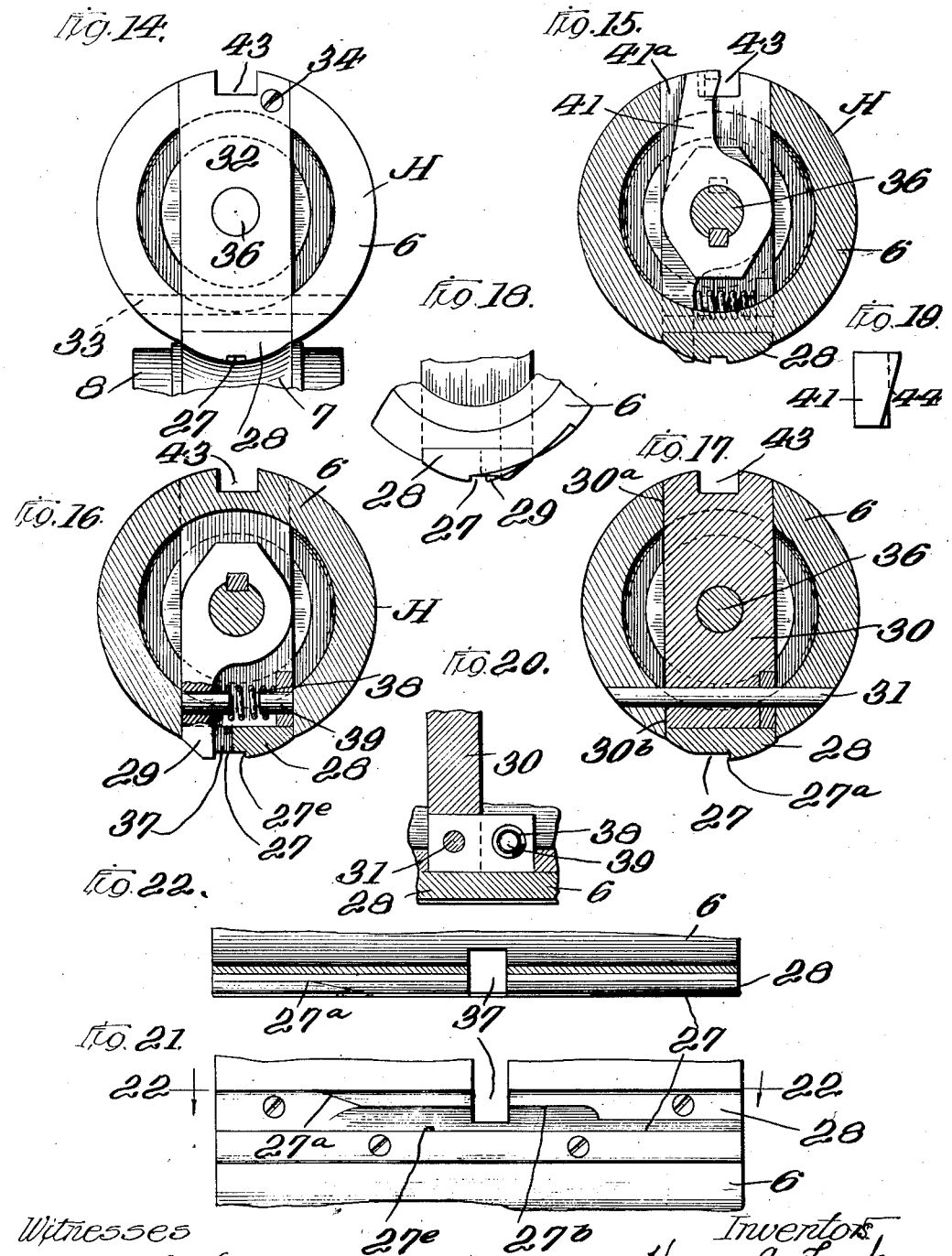

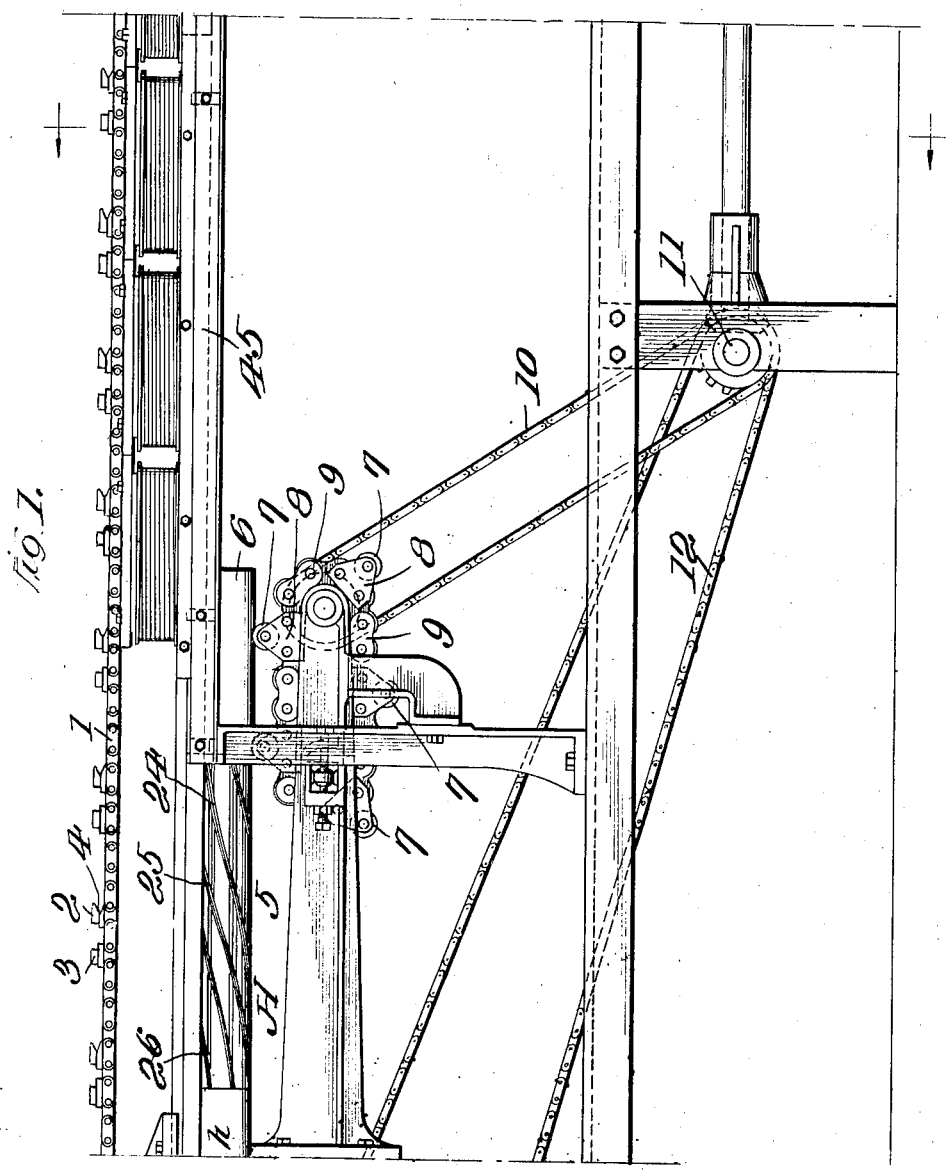

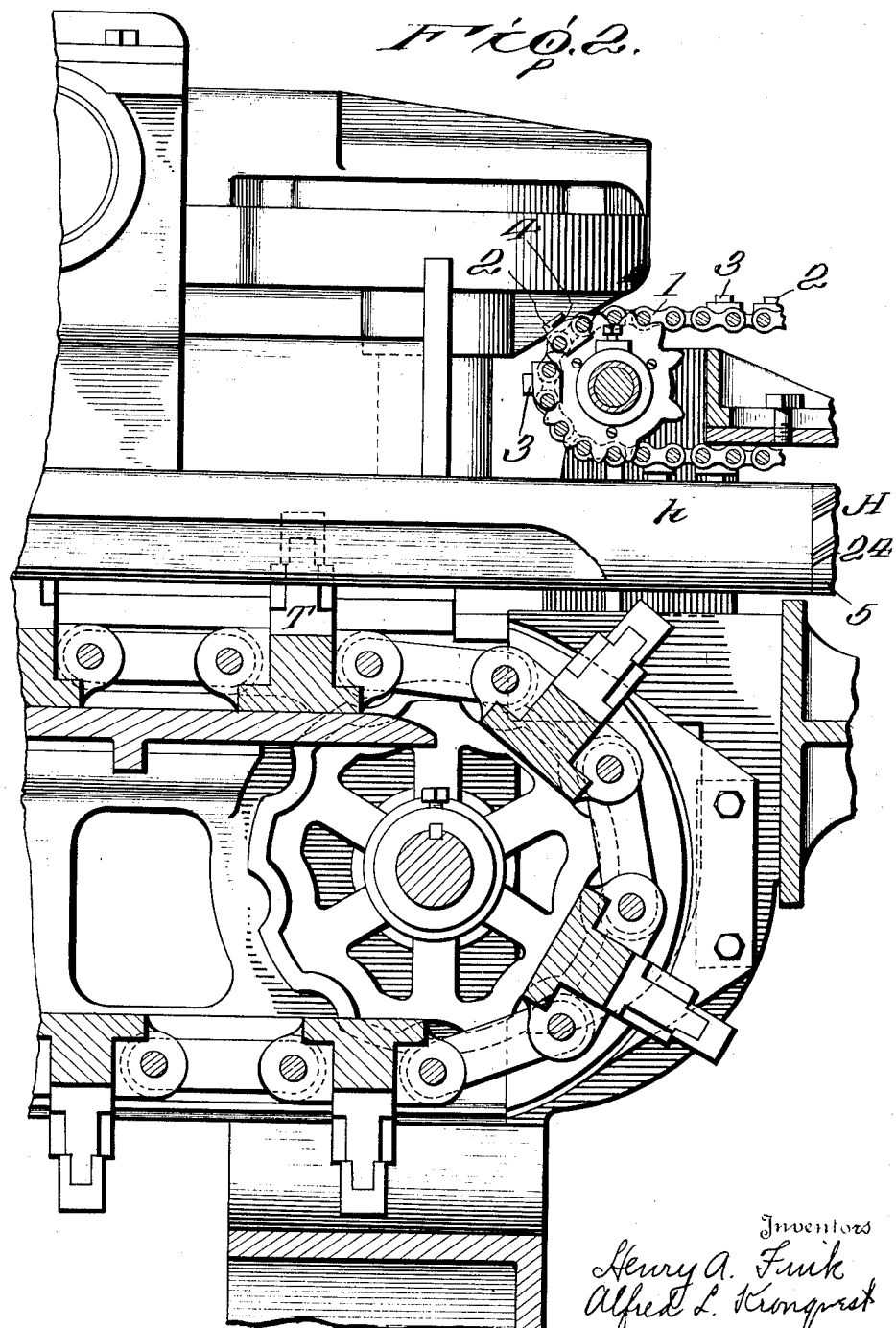

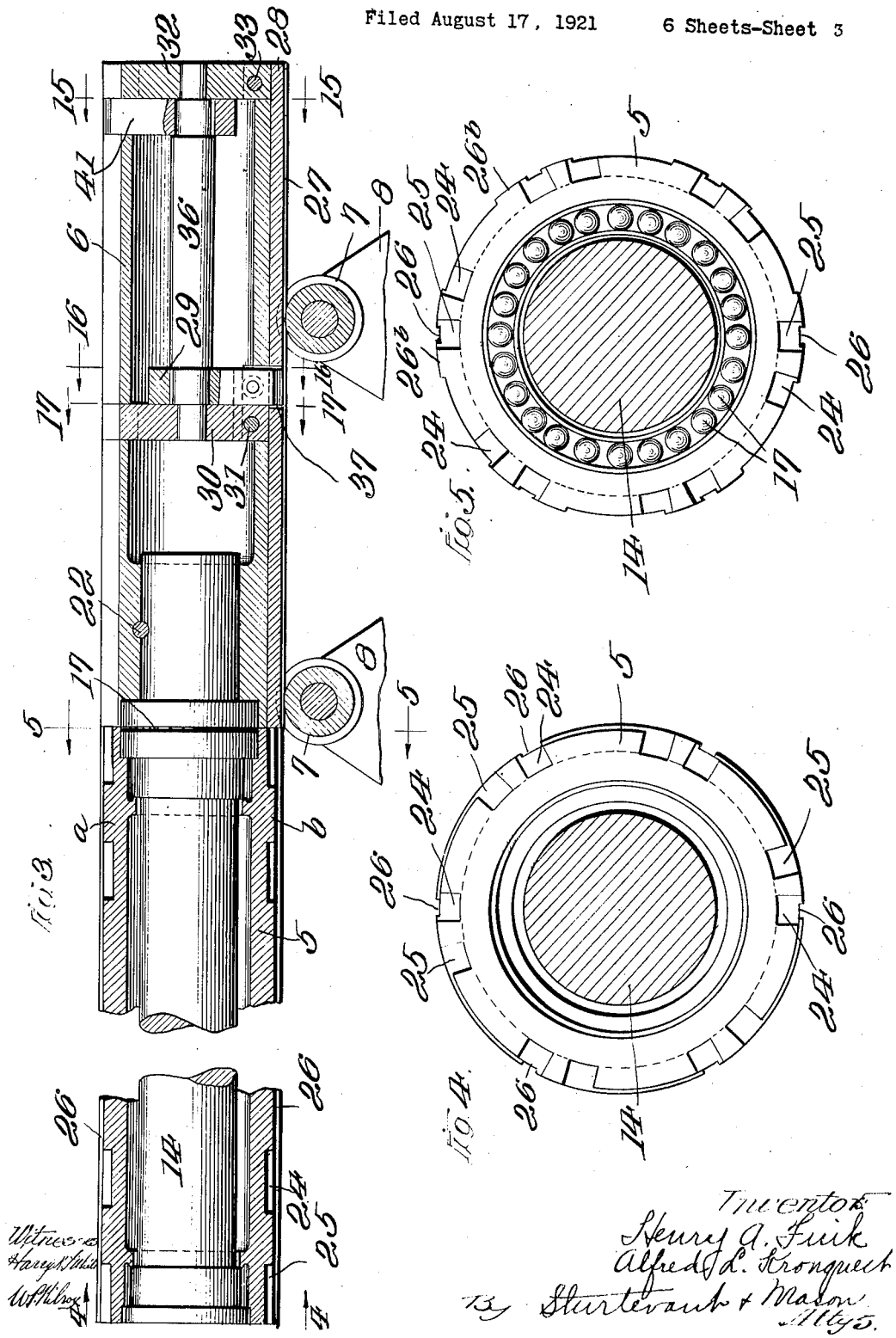

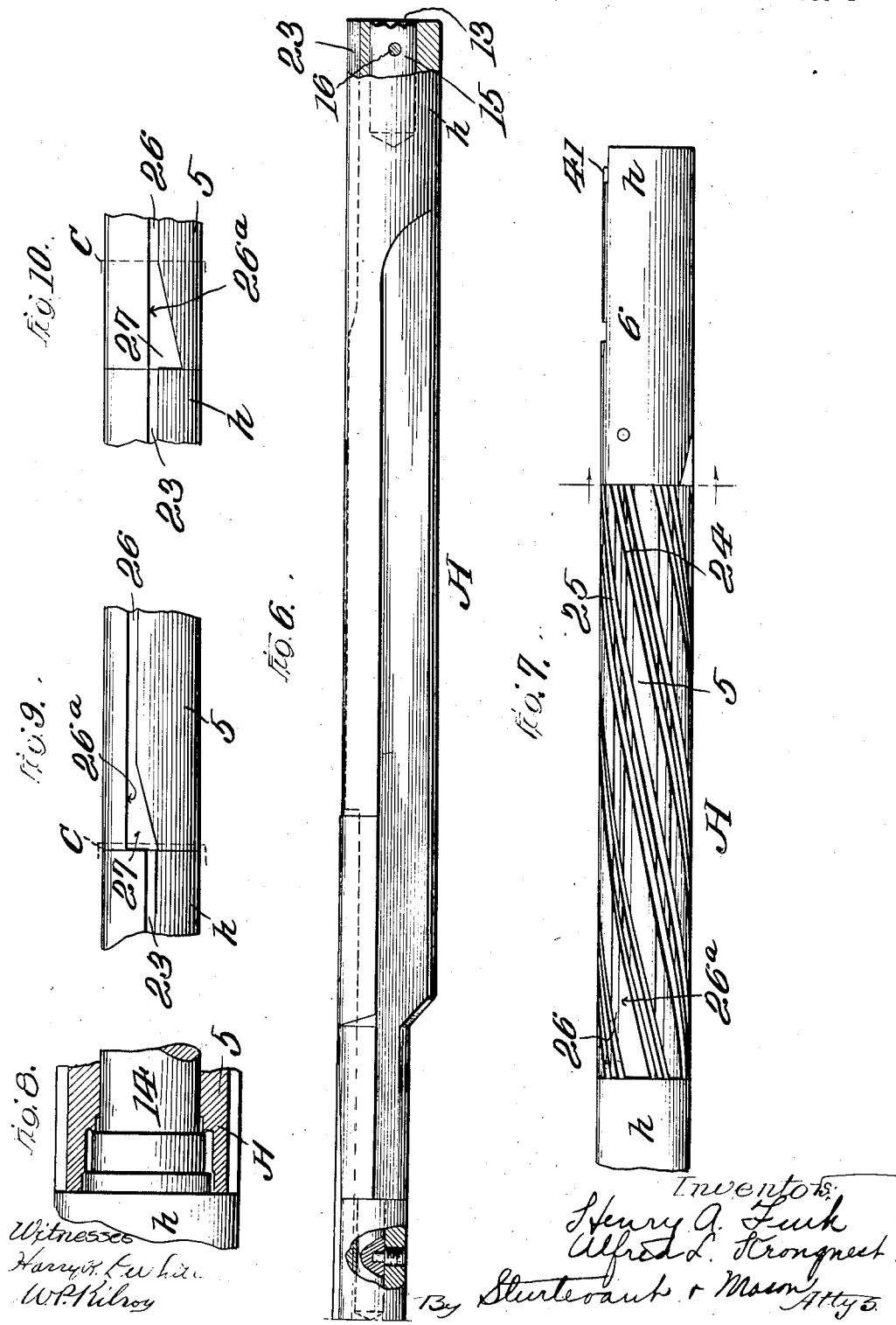

Patented June 15, 1926.

1,589,059

UNITED STATES PATENT OFFICE.

HENRY A. FINK, OF SYRACUSE, NEW YORK, AND ALFRED L. KRONQUEST, OF CHICAGO, ILLINOIS, ASSIGNORS TO CONTINENTAL CAN COMPANY, INC., OF SYRACUSE, NEW YORK, A CORPORATION OF NEW YORK.

CAN-MAKING MACHINE.

Application filed August 17, 1921. Serial No. 493,092.

The invention relates to new and useful improvements in can-making machines, and more particularly to a mechanism associated with a body maker and a soldering machine for receiving the can body from the body maker and delivering the same to the soldering machine in proper position for soldering.

In a body maker, it is preferable to unite the side edges of a seam when said edges are uppermost, while on the other hand in a soldering machine, particularly the solder bath type, it is preferable to solder said side seam when said side seam of the can body is lowermost. An object of the invention is to provide a mechanism which receives the can body with the side seam uppermost and turns said can body over until the side seam is lowermost, which mechanism operates to rotate the can body while it is moving continuously in a forward direction and without slacking the speed of movement thereof.

A further object of the invention is to provide a mechanism of the above character wherein the can body is conveyed along a horn by a conveying chain carrying supporting and pushing lugs for the can bodies, and wherein said lugs as they move forward bring about a turning over of the can body to bring the side seam to the lowermost position.

A still further object of the invention is to provde a machine of the above type with a rectifying device which engages the side seam and insures that the can body is given a complete semi-rotation so as to bring the side seam into alinement with a holding groove in the bottom of the end portion of the horn.

Another object of the invention is to provide a machine of the above type wherein said rectifying mechanism is actuated by the traveling lugs on the conveyor chain.

These and other objects will in part be obvious and will in part be hereinafter more fully disclosed.

In the drawings, which show by way of illustration one embodiment of the invention:—

Figure 1 is a side view of a portion of a machine embodying the invention;

Fig. 2 is a vertical sectional view on an enlarged scale through the end of a body maker to which the invention is applied;

Fig. 3 is a longitudinal sectional view through the portion of the horn which contains the invention;

Fig. 4 is an end view of the outer sleeve taken on the line 4—4 of Fig. 3;

Fig. 5 is an end view from the other end of the rotatable sleeve and taken on the line 5—5 of Fig. 3;

Fig. 6 is a side view of a portion of the horn of the body maker;

Fig. 7 is a side view of a portion of the horn showing the rotatable section with the spiral grooves therein which bring about its rotation;

Fig. 8 is a view, partly in section, of the front end of the rotatable section and the parts which support the same;

Fig. 9 is a view showing diagrammatically the rotatable section and its position relative to the immediate portion of the horn when the can body is first moved thereon;

Fig. 10 is a similar view, but showing the position of the rotatable section when the can body is just leaving the immediate portion of the horn adjacent the receiving end of the rotatable sleeve;

Fig. 11 is a sectional view through a portion of the horn and showing the traveling lugs conveying the can body;

Fig. 12 is a plan view of a portion of the conveying chain;

Fig. 13 is a diagrammatic view shewing in full lines the position of the side seam as delivered onto the rotatable section and in dotted lines the position of the side seam as it leaves the rotatable section;

Fig. 14 is an end view of the horn;

Fig. 15 is a sectional view on the line 15—15 of Fig. 3;

Fig. 16 is a sectional view on the line 16—16 of Fig. 3;

Fig. 17 is a sectional view on the line 17—17 of Fig. 3;

Fig. 18 is a view of the lower portion of the end section from the front end thereof;

Fig. 19 is a top plan view of the operating arm for actuating the rectifying finger;

Fig. 20 is a sectional view showing the manner of supporting the inner bearing for the shaft carrying the rectifying finger;

Fig. 21 is a plan view of the lower portion of the extreme end of the horn; and

Fig. 22 is a sectional view on the line 22—22 of Fig. 21.

The invention has to do with a turning mechanism used in conjunction with a body maker and a soldering machine, and has for its purpose to turn the can body as it is received from the body maker with its side seam uppermost to a position where the side seam is lowermost, so that it may be presented to a soldering roll in a solder bath for soldering. The turning mechanism operates to turn the can without retarding its forward movement. This turning movement is accomplished broadly by the use of a turning section in the horn which has a longitudinal groove for the side seam of the can which causes the can to rotate with the turning section of the horn. This turning section of the horn also has spiral grooves which are adapted to be engaged by lugs on a conveyor chain, which moves the can body endwise on the horn. These lugs engaging one of the spiral grooves as they move the can forward cause the section of the horn to rotate and thus turns the can body to bring the seam to a lowermost position. A rectifying device is also provided which insures a complete semi-rotation of the can body, so that the side seam will be properly presented to the soldering roll for soldering.

Referring more in detail to the drawings, the end of the machine for making the bodies is shown in Fig. 2. This body maker may be of any desired type but preferably of the type which makes a lock and lap seam. The trucks of the body maker indicated at T slide the can bodies along the horn H until they are brought underneath the conveyor chain indicated at 1. The conveyor chain is driven by suitable connection with the body maker. The conveyor chain is provided with pairs of spaced lugs 2 and 3. The front end of the can body is moved by a truck T into the recess 4 in the lug 2, and the lug 3 engages the rear edge of the can body and forces it along the horn. The horn proper of the body maker consists of a non-rotatable main section $h$, a rotatable section 5, and a non-rotatable section 6. These sections $h$ and 6 are rigidly connected. The horn H has a reciprocating movement in the preferred form of the invention.

The present invention is especially adapted for use in connection with a lock and lap seam body maker of the type shown and described in the application of Alfred L. Kronquest, filed August 9, 1921, Serial No. 490, 895, in which machine the horn reciprocates and through which machine the can body travels continuously while its edges are being interlocked and bumped. Reciprocations of the horn, however, are incidental to the turning mechanism, forming the subject-matter of the present application.

The end of the horn rests on supporting rollers 7—7. These rollers 7—7 are rotatably supported by pairs of lugs 8—8 which are connected by links 9—9 so as to form a continuous chain. The distance between adjacent rollers 7—7 is slightly greater than the length of the can body. This chain carrying the rollers 7—7 is driven by a sprocket chain 10 from a shaft 11 which is in turn driven by the sprocket chain 12. The rollers 7—7 travel with the can bodies and engage the horn in succession. This forms a very efficient means for supporting the end of the horn and, at the same time, permits the can bodies to be moved along the horn without passing between the rollers and horn. This supporting means per se forms no part of the present invention, and has been merely referred to as one way of supporting the end of the horn.

The rotatable section 5 of the horn is in the form of a sleeve. The end $h$ of the horn H of the body machine is shown in Figs. 1 and 2. There is a recess 13 in the end of the horn. A cylindrical support 14 has its end reduced, as indicated at 15, and this reduced end extends into the recess 13 and is firmly secured therein by a locking bolt 16. The sleeve forming the rotatable section 5 is placed on this cylindrical support 14. Said sleeve rotates on suitable bearings on the support 14 and a ball bearing 17 takes up the end thrust so that said sleeve rotates freely. The section 6 is secured on the end of the cylindrical support 14 by a bolt 22. As above noted, the section 6, the cylindrical support 14, and the main section H of the horn are all rigidly secured together to reciprocate back and forth, but have no rotating movement, while the section 5 may be rotated freely.

The main section of the horn is formed with a groove 23 in which the lugs 2 and 3 travel as well as the side seam of the can body. The section 5 is provided with grooves for these lugs but the grooves for the lugs are spirally arranged. The grooves for the lugs 2 are indicated at 24—24, while the grooves for the lugs 3 are indicated at 25—25, it will be noted that these grooves, as shown clearly in Figs. 4, 5 and 7, are in pairs and they are so disposed that, when the first lug enters a spiral groove it will start the section 5 rotating and the next groove will be brought into alinement for the following lug to enter so that the lugs enter their respective grooves one after the other, and as they are held to a right line movement parallel with the axis of the horn it will cause the section 5 to rotate. The lugs are set on the supporting chain therefor, at a slight angle to the path of travel to the chain and this angle is formed so as to correspond to the pitch or direction of the spiral grooves.

The rotatable section 5 is also provided with a series of grooves 26—26 for the seam of the can body. Each groove 26 at the receiving end of the rotatable section 5 is expanded into a wide open mouth 27 on one side thereof, see Figs. 7, 9 and 10. While the can body is moving off from the end of the main section h of the horn H, it cannot be rotated for the reason that its side seam is in the groove 23 in the horn; therefore, the rotatable section 5 must rotate within the can body until it is fully on the section 5. The wide open mouth 27 gives clearance for the side seam and permits the section 5 to rotate, and by the time the wall 26ª of the groove comes into alinement with the groove 23 in the main section h of the horn, the can body is clear on to the horn, the side seam located against this wall 26ª of the grooves, and then the can body rotates with the section 5. In Fig. 9 there is shown in broken lines the end of a can body C just as it begins to overlap the end of the section 5 and the position of the groove 26 relative to the groove 23 in the section h of the horn. In Fig. 10, the end of the can body is shown as having progressed onto the horn to a position where the side seam is brought into contact with the side wall 26ª of the groove 26 so that the can body will be rotated with the rotatable section 5.

When the can body leaves the rotatable section 5, and moves onto the section 6, it continues its rotation until it is substantially clear of the movable section 5. In other words, the groove 26 at the delivery end of the rotatable section 5 is not widened out as at the receiving end. In order to reduce the frictional grip of the rotating bar on the can body and, at the same time, have said rotatable part of substantially the same diameter as the can body, said rotatable part is cut away on its outer surface, as shown in Fig. 5, so as to leave high places 26ᵇ in which the groove 26 is located. This makes a good bearing surface for the can body without undue friction thereon.

The section 6 of the horn has a groove 27 in the extreme lower face thereof, see Figs. 3, 14 and 15. As a matter of fact, the horn is cut away to receive a hardened steel part 28, and the groove 27 is formed in this hardened steel member. At the receiving end of the section 6, the surface at one side of the groove 27 is cut away as indicated at 27ª, thus forming an open mouth for the groove 27 at the receiving end of the section 6. This enables the can body to rotate after it has been moved onto the section 6. The groove 27 is also enlarged, as indicated at 27ᵇ, see Fig. 21.

The machine is particularly adapted for turning a can body having a lock and lap seam, that is, a side seam interlocked throughout a greater portion of its length but having at each end of the side seam flat overlapped sections of metal which are not interlocked. On the inner surface of the can body there is a projecting rib c formed by the interlocked parts of the seam which engages the groove in the horn. As soon as the projecting parts c of the seam leave the groove 26 in the rotatable section 5, the can body may cease rotation as the positive grip of the section 5 on the can body is lost. If the can body is slighly out of round there will be sufficient frictional grip between the rotating part 5 and the end portion of the can body where the seam is overlapped to continue the rotation of the can body to bring the side seam fully around to the lowermost position in alinement with the groove 27, but in order to positively line up the side seam of the groove 27 there has been provided a rectifying finger 29.

The horn section 6 is in the form of a sleeve. Midway between the ends of this section there is a supporting bearing 30 which is placed in the sleeve from an opening 30ª at one side of the same and extends into an opening 30ᵇ in the other side of the sleeve and is held in place by a pin 31. At the extreme right hand end of the horn there is a second bearing plate 32 which is held in place by a pin 33 and a screw 34. Mounted in these bearing plates 30 and 32 is a shaft 36. The rectifying finger 29 is splined on this shaft and extends down through an opening 37 in the wall of the sleeve and in the hardened plate 28. A spring 38 encircles a pin 39 at one end and a pin 40 at the other end and bears against said finger 29 and normally moves the same to the left, as viewed in Figs. 15 and 16, which is a direction away from a side wall 27ᵉ of the groove 27. This opening 37 through which the rectifying finger extends is midway the length of the enlargement 27ᵇ. Also mounted on the shaft 36 is an upwardly projecting arm 41. Said arm extends out through an opening 41ª in the sleeve forming the section 6 and projects normally into a groove 43 formed in said sleeve 6 through which the lugs 2 and 3 pass. The inner end of this arm 41 is slightly inclined, as shown at 44, see Fig. 19, and as the lugs travel along the groove 43 one after the other, they will engage this inclined face of the arm 41 and swing the same to the left, as viewed in Fig. 15, which will oscillate the shaft 36 and move the rectifying finger 29 to the right.

The distance between the arm 41 and the rectifying finger is substantially half a can length plus the distance between two cans traveling along the horn. As a result the following takes place: The forward lug 2 will swing the arm 41 when the rectifying finger is idle, that is, when there is no can body to be moved thereby. As soon as this lug passes the spring forces the rectifying finger to its normal position away from the side edge 27ᵉ of the groove 27. The seam of the can body moved by the lugs 3 may or may not be up against the side edge 27e, depending upon whether or not there has been a slip between the extreme end of the can and rotating section of the horn after the interlocked portion of the seam has left the groove in said rotated section. If, however, the side seam is not up against the side wall 27e, when the can body is substantially half way over the rectifying finger 29, the rear lug 3 will engage the arm 41 and will swing the rectifying finger so as to cause it to engage the projecting portion c of the side seam at the inside of the can body and move the side seam up against the wall 27e. In other words, this rectifying finger completes the semi-rotation of the side seam. If, for any reason, it is not completed when the seam reaches this point on the horn section 6, the seam of the can body moves into the groove 27 and is thus properly located for presentation to the solder bath. Before the can leaves the section 6 it comes into contact with magnetic supporting rails 45. These rails are curved to conform to the outer surface of the can body and are spaced so as to allow the lugs and chain to travel between the same. The forward lug 2 which is hook-shaped supports the front end of the can against the magnetic rails. The rear end lug 3 is merely a pushing lug. The magnetic rails support the can body as it is conveyed forward into the soldering machine. It is noted that the outer surface of the steel bar 28 in the horn section 6 is on a smaller radius than the horn section 6 and the bar is located so that it projects slightly beyond the cylindrical surface of the section 6; therefore, the horn section 6 is larger in diameter vertically through the horn than horizontally through the horn. This aids in maintaining the side seam in the groove 27.

It is obvious that minor changes in the details of construction and in the arrangement of the parts may be made without departing from the spirit of the invention as set forth in the appended claims.

Having thus described the invention, what is claimed as new is:—

1. A can machine including a supporting horn, means for conveying can bodies along said horn, said horn having a rotatable sleeve, said rotatable sleeve having means for engaging the can body for causing said can body to rotate with said sleeve, said moving means and said sleeve having cooperating devices whereby said sleeve is rotated by said can conveying means.

2. A can machine including a supporting horn having a rotatable sleeve section, a movable endless conveyor, lugs carried by said conveyor and moving the can bodies along the horn and for engaging and rotating the sleeve section in the horn, said sleeve section having means for engaging the can body for giving the same a semi-rotation on the horn while moving along said horn.

3. A can machine including a supporting horn having a rotatable section, a continuously moving conveyor including a pair of lugs for each can body for engaging and moving the same along the horn and over said rotatable sleeve section, said lugs operating to rotate said sleeve section, and means whereby said sleeve section operates to give the can body a semi-rotation while moving along the horn.

4. A can machine including a supporting horn having a rotatable section, a continuously moving conveyor including a pair of lugs for each can body for engaging and moving the same along the horn and over said rotatable sleeve section, said lugs operating to rotate said sleeve section, means whereby said sleeve section operates to give the can body a semi-rotation while moving along the horn, and rectifying means for insuring that the can body is given a complete semi-rotation.

5. A can machine including a supporting horn, means for moving the can body along the horn and continuously through the machine, means for giving the can body a semi-rotation on the horn while moving on said horn, and rectifying means for insuring that the can body is given a complete semi-rotation.

6. A can machine including a supporting horn, means for moving a can body continuously through the machine, a traveling lug for moving the can body along the horn, means for giving the can body a semi-rotation on the horn while moving along the same, a rectifying finger for engaging the side seam of the can body for completing the semi-rotation of the can body, and means actuated by the traveling lug for operating said rectifying finger.

7. A can machine including a supporting horn, means for moving a can body continuously through the machine, a traveling lug for moving the can body along the horn, means for giving the can body a semi-rotation on the horn while moving along the same, a rectifying finger for engaging the side seam for insuring that the can body is given a complete semi-rotation, a spring for moving said rectifying finger to cause the same to engage the side seam, and means actuated by the traveling lug for retracting the rectifying finger and holding the same out of the path of travel of the side seam until the can body is well over the rectifying finger.

8. A can machine including a supporting horn, having rigidly connected non-rotatable sections provided with grooves on their upper and lower faces, respectively, for the side seam of the can body, said horn having a rotatable supporting section for the can body intermediate said non-rotatable section, means for conveying the can body along the horn and means for rotating said rotatable section for bringing the side seam of the can body leaving one groove into alinement with the other.

9. A can machine including a supporting horn having rigidly connected non-rotatable sections provided with grooves on their upper and lower faces respectively for the side seam of a can body, a traveling lug for moving the can body continuously through the machine and rotatable means intermediate said sections and operated by the traveling lug for giving the can body a semi-rotation to carry the side seam from one groove to the other.

10. A can machine including a supporting horn having rigidly connected non-rotatable sections provided with grooves on their upper and lower faces respectively for the side seam of a can body, a traveling lug for moving the can body continuously through the machine, rotatable means intermediate said sections and operated by the traveling lug for giving the can body a semi-rotation to carry the side seam from one groove to the other, and rectifying means operated by the traveling lug for insuring the alinement of the side seam with the lowermost groove in the section of the horn.

11. A can machine including a supporting horn having rigidly connected non-rotatable sections provided with grooves on their upper and lower faces, respectively, for the side seam of the can body, said horn having a rotatable supporting section for the can body intermediate said non-rotatable section, means for conveying the can body along the horn and for rotating said rotatable section for bringing the side seam of the can body leaving one groove into alinement with the other, said rotatable section of the horn having grooves therein extending longitudinally of said rotatable section in which the side seam of the can body is located while passing over said rotatable section.

12. A can machine including a supporting horn having rigidly connected non-rotatable sections provided with grooves on their upper and lower faces respectively for the side seam of a can body, a rotatable sleeve intermediate said non-rotating sections, said sleeve having a groove adapted to receive the side seam of the can body, a traveling lug for moving the can body along the horn, said sleeve having a spiral groove adapted to receive said lug whereby the lug rotates the sleeve and gives the can body a semi-rotation.

13. A can machine including a supporting horn having rigidly connected non-rotatable sections provided with grooves on their upper and lower faces respectively for the side seam of a can body, a rotatable sleeve intermediate said non-rotating sections, said sleeve having a groove adapted to receive the side seam of the can body, a traveling lug for moving the can body along the horn, said sleeve having a spiral groove adapted to receive said lug whereby the lug rotates the sleeve and gives the can body a semi-rotation, and rectifying means for engaging the side seam on one of the non-rotating sections for insuring alinement of the side seam with the groove therein.

14. A can machine including a supporting horn having rigidly connected non-rotatable sections provided with grooves on their upper and lower faces respectively for the side seam of a can body, a rotatable sleeve intermediate said non-rotating sections, said sleeve having a groove adapted to receive the side seam of the can body, a traveling lug for moving the can body along the horn, said sleeve having a spiral groove adapted to receive said lug whereby the lug rotates the sleeve and gives the can body a semi-rotation, rectifying means for engaging the side seam on one of the non-rotating sections for insuring alinement of the side seam with the groove therein, and means operated by the traveling lug for actuating said rectifying means.

15. A can machine including a supporting horn having rigidly connected non-rotatable sections provided with grooves on their upper and lower faces respectively for the side seam of a can body, an intermediate sleeve in alinement with said non-rotatable sections and having a groove for the side seam of the can body, said sleeve having a portion thereof cut away to form a wide open mouth for the groove whereby said sleeve may rotate in the can body until the can body is fully on the sleeve, and means for rotating said sleeve.

16. A can machine including a supporting horn having rigidly connected non-rotatable sections provided with grooves on their upper and lower faces respectively for the side seam of a can body, an intermediate sleeve in alinement with said non-rotatable sections and having a groove for the side seam of the can body, said sleeve having a portion thereof cut away to form a wide open mouth for the groove whereby said sleeve may rotate in the can body until the can body is fully on the sleeve, and a traveling lug for moving the can body along the horn, said sleeve having a spiral groove adapted to receive the traveling lug whereby said sleeve is rotated.

17. A can machine including a supporting horn having rigidly connected non-rotatable sections provided with grooves on their upper and lower faces respectively for the side seam of a can body, an intermediate sleeve in alinement with said non-rotatable sections and having a groove for the side seam of the can body, said sleeve having a portion thereof cut away to form a wide open mouth for the groove whereby said sleeve may rotate in the can body until the can body is fully on the sleeve, means for rotating said sleeve, said non-rotatable section receiving the can body from the intermediate sleeve having its surface cut-away to form a wide open mouth for the groove of the side seam whereby said can body may be rotated on the non-rotatable section to which it is delivered until said can body is fully positioned on said non-rotatable section.

18. A can machine including a supporting horn having rigidly connected non-rotatable sections provided with grooves on their upper and lower faces respectively for the side seam of a can body, an intermediate sleeve in alinement with said non-rotatable sections and having a groove for the side seam of the can body, said sleeve having a portion thereof cut away to form a wide open mouth for the groove whereby said sleeve may rotate in the can body until the can body is fully on the sleeve, means for rotating said sleeve, said non-rotatable section receiving the can body from the intermediate sleeve having its surface cut-away to form a wide open mouth for the groove of the side seam whereby said can body may be rotated on the non-rotatable section to which it is delivered until said can body is fully positioned on said non-rotatable section, and a rectifying finger for engaging the side seam while in the cut-away portion in the non-rotatable section for insuring the alinement of the side seam with the said groove.

19. A can machine including a supporting horn having a section at the end thereof provided with a groove in said lower face for the side seam of the can body, a rotatable sleeve for delivering the can body onto said section, said sleeve having a groove therein for the side seam of the can body, said non-rotatable section having a portion of its surface cut away at the receiving end thereof to form a wide open mouth for the groove of the side seam whereby the can body may be rotated on the non-rotatable section until said can body is moved onto said non-rotatable section, and means for moving the can body along said horn.

20. A can machine including a supporting horn having a section at the end thereof provided with a groove in said lower face for the side seam of the can body, a rotatable sleeve for delivering the can body onto said section, said sleeve having a groove therein for the side seam of the can body, said non-rotatable section having a portion of its surface cut away at the receiving end thereof to form a wide open mouth for the groove of the side seam whereby the can body may be rotated on the non-rotatable section until said can body is moved onto said non-rotatable section, means for moving the can body along said horn, and a rectifying finger for engaging the side seam for insuring the complete semi-rotation of the can body to bring the seam into alinement with the groove in said non-rotatable section.

21. A can machine including a supporting horn having a section at the end thereof provided with a groove in said lower face for the side seam of the can body, a rotatable sleeve for delivering the can body onto said section, said sleeve having a groove therein for the side seam of the can body, said non-rotatable section having a portion of its surface cut away at the receiving end thereof to form a wide open mouth for the groove of the side seam whereby the can body may be rotated on the non-rotatable section until said can body is moved onto said non-rotatable section, and a traveling lug for moving the can body along the horn and for rotating said sleeve.

22. A can machine including a supporting horn having a section at the end thereof provided with a groove in said lower face for the side seam of the can body, a rotatable sleeve for delivering the can body onto said section, said sleeve having a groove therein for the side seam of the can body, said non-rotatable section having a portion of its surface cut away at the receiving end thereof to form a wide open mouth for the groove of the side seam whereby the can body may be rotated on the non-rotatable section until said can body is moved onto said non-rotatable section, means for moving the can body along said horn, a rectifying finger located within said non-rotatable section of the horn and having the end thereof projecting into the cut-away portion and adapted to engage the side seam for moving the can body to insure alinement of the side seam with the groove in the non-rotatable section, a shaft supporting said finger, a spring for rotating the shaft to cause the rectifying finger to move the can body, an arm carried by the shaft and projecting through the horn, and a traveling lug for engaging the can body for moving the same and for rotating said sleeve and for engaging said arm for moving the rectifying finger.

23. A can machine including a supporting horn having a non-rotatable section at the end thereof, said section having a groove in its upper face, a lug traveling in said groove and adapted to move the can body along the horn, said horn having a bearing located in its under face having a groove therein for the side seam of the can body, said bearing having its outer surface curved on a less radius than the curvature of the horn and projecting beyond the surface of the horn for insuring the holding of the side seam in the groove of the horn.

24. A can machine including a supporting horn having a rotatable section for giving to the can body semi-rotation, said section having a series of pairs of spiral grooves adapted to receive respectively pairs of lugs adapted to move the can bodies and to rotate said sleeve.

25. A can machine including a supporting horn having a rotatable section for giving to the can body semi-rotation, said section having a series of pairs of spiral grooves adapted to receive respectively pairs of lugs adapted to move the can bodies and to rotate said sleeve, said sleeve having longitudinally extending grooves for the side seam of the can body.

26. A can machine including a supporting horn having a rotatable section for giving to the can body semi-rotation, said section having a series of pairs of spiral grooves adapted to receive respectively pairs of lugs adapted to move the can bodies and to rotate said sleeve, said sleeve having longitudinally extending grooves for the side seam of the can body, the longitudinal portions of said sleeve being cut away between the grooves for the side seam in order to reduce the frictional contact between the horn and the can body.

In testimony whereof, we affix our signatures.

HENRY A. FINK.
ALFRED L. KRONQUEST.